United States Patent
Bernard et al.

(10) Patent No.: US 7,638,447 B2
(45) Date of Patent: Dec. 29, 2009

(54) MINERAL WOOL COMPOSITION

(75) Inventors: Jean-Luc Bernard, Giencourt (FR);
Eric Bocquet, Le Brèche (FR)

(73) Assignee: Saint-Gobain Isover, Courbevoie (FR)

( * ) Notice: Subject to any disclaimer, the term of this patent is extended or adjusted under 35 U.S.C. 154(b) by 280 days.

(21) Appl. No.: 10/574,605

(22) PCT Filed: Oct. 4, 2004

(86) PCT No.: PCT/FR2004/050480

§ 371 (c)(1),
(2), (4) Date: Dec. 11, 2006

(87) PCT Pub. No.: WO2005/033032

PCT Pub. Date: Apr. 14, 2005

(65) Prior Publication Data
US 2007/0135291 A1    Jun. 14, 2007

(30) Foreign Application Priority Data

Oct. 6, 2003  (EP) ................................. 03292463
Jan. 7, 2004  (FR) ................................. 04 00084

(51) Int. Cl.
*C03C 13/06*  (2006.01)
*C03C 13/00*  (2006.01)
*C03C 3/083*  (2006.01)
*C03C 3/085*  (2006.01)
*C03C 3/087*  (2006.01)

(52) U.S. Cl. ............................. 501/36; 501/35; 501/68; 501/69; 501/70

(58) Field of Classification Search .................. 501/36, 501/68, 69, 70, 35
See application file for complete search history.

(56) References Cited

U.S. PATENT DOCUMENTS

| 6,156,683 | A * | 12/2000 | Grove-Rasmussen et al. | . 501/35 |
| 6,313,050 | B1 * | 11/2001 | De Meringo et al. | ......... 501/36 |
| 6,346,494 | B1 * | 2/2002 | Jensen et al. | .................. 501/36 |
| 2003/0181306 | A1 * | 9/2003 | Bernard et al. | ................ 501/36 |
| 2006/0281622 | A1 * | 12/2006 | Maricourt et al. | ............. 501/36 |

FOREIGN PATENT DOCUMENTS

| WO | 00/17117 | 3/2000 |
| WO | 01/68546 | 9/2001 |

* cited by examiner

*Primary Examiner*—Karl E Group
*Assistant Examiner*—Noah S Wiese
(74) *Attorney, Agent, or Firm*—Oblon, Spivak, McClelland, Maier & Neustadt, L.L.P.

(57) ABSTRACT

The subject of the invention is a mineral wool capable of dissolving in a physiological medium, which wool comprises the constituents below in the following percentages by weight:

Figure 1:
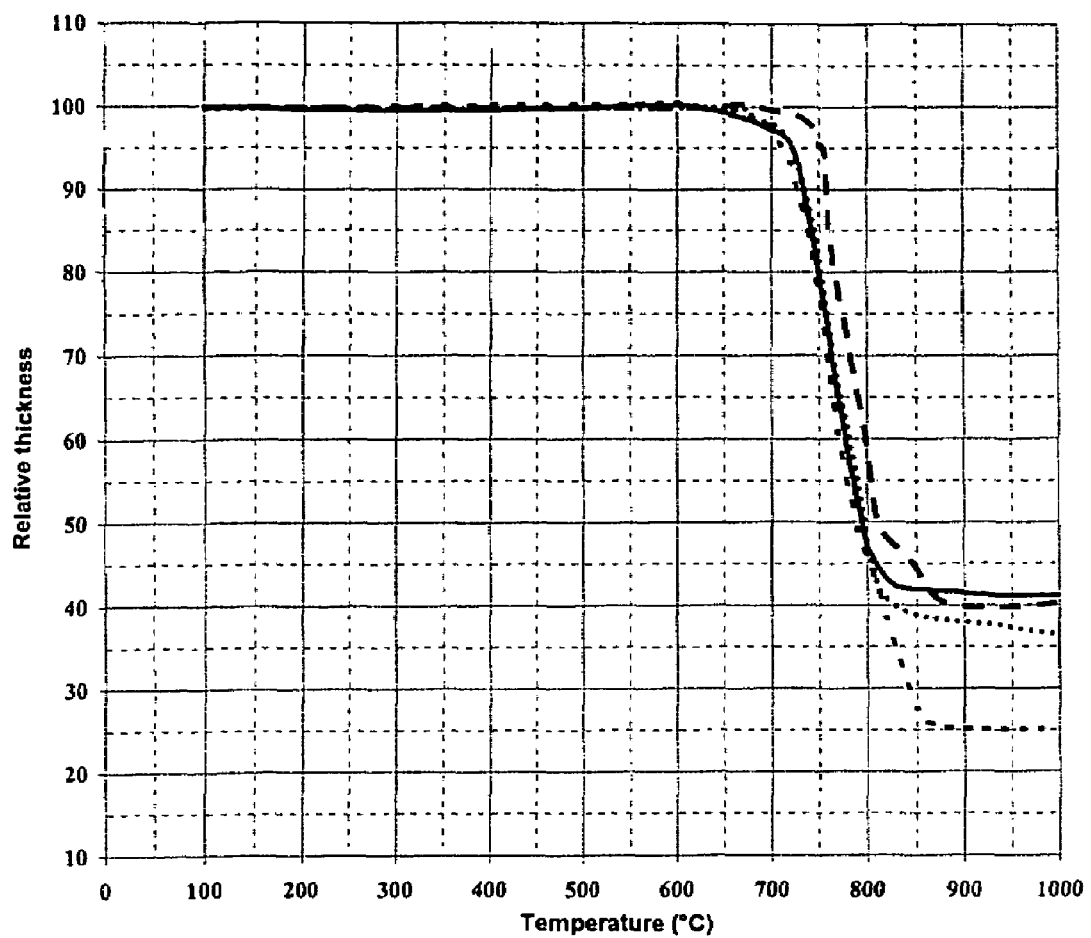

| | |
|---|---|
| $SiO_2$ | 39–44%, preferably 40–43% |
| $Al_2O_3$ | 16–27%, preferably 16–26% |
| CaO | 6–20%, preferably 8–18% |
| MgO | 1–5%, preferably 1–4.9% |
| $Na_2O$ | 0–15%, preferably 2–12% |
| $K_2O$ | 0–15%, preferably 2–12% |
| $R_2O$ ($Na_2O + K_2O$) | 10–14.7%, preferably 10–13.5% |
| $P_2O_5$ | 0–3%, especially 0–2% |
| $Fe_2O_3$ (total iron) | 1.5–15%, especially 3.2–8% |
| $B_2O_3$ | 0–2%, preferably 0–1% |
| $TiO_2$ | 0–2%, preferably 0.4–1%. |

21 Claims, 1 Drawing Sheet

MINERAL WOOL COMPOSITION

The present invention relates to the field of artificial mineral wool. It relates more particularly to mineral wool intended for the manufacture of thermal and/or acoustic insulation materials.

The invention relates more particularly to mineral wool of the rock wool type, that is to say the chemical compositions of which have a high liquidus temperature and are highly fluid at their fiberizing temperature, combined with a high glass transition temperature.

Conventionally, this type of mineral wool is fiberized by what are termed "external" centrifugal processes, for example of the type of those using a cascade of spinning wheels supplied with molten material by a static delivery device, as described for example in Patent EP-0 465 310 or Patent EP-0 439 385.

The fiberizing process termed "internal" centrifugal process, that is to say one making use of spinners rotating at high speed and pierced by orifices, is, in contrast, conventionally reserved for fiberizing mineral wool of the glass wool type, having broadly a composition relatively rich in alkali metal oxides and a low alumina content, a lower liquidus temperature, the viscosity of the wool at the liquidus temperature being higher than that of rock wool or basalt wool. This process is described for example in Patent EP-0 189 354 or Patent EP-0 519 797.

Technical solutions allowing the internal centrifugal process to be adapted to the fiberizing of rock wool are known, for example from WO 93/02977, by modifying the composition of the constituent material of the spinners and of their operating parameters. Such adaptation consequently makes it possible to combine properties that hitherto have only been inherent to one or other of the two types of wool, namely rock wool or glass wool. Thus the rock wool obtained by an internal centrifugal process is of a quality comparable to that of glass wool, with a lower content of unfiberized particles than in conventionally obtained rock wool. However, it retains the two key advantages associated with its chemical nature, namely a low chemical material cost and a high temperature resistance.

Since in recent years the criterion of biodegradability of mineral wool, namely its ability to rapidly dissolve in a physiological medium, for the purpose of preventing any potential pathogen risk associated with possible accumulation of the finest fibres in the organism by inhalation, has been added to the criteria of quality and of industrial and economic feasibility, a mineral wool composition of the rock wool type adapted accordingly has been proposed in WO 00/17117. This composition, given in detail below, is characterized by the combination of a high alumina content with a high alkali metal (sodium and potassium) oxide ($R_2O$) content:

| | |
|---|---|
| $SiO_2$ | 39–55%, preferably 40–52% |
| $Al_2O_3$ | 16–27%, preferably 16–25% |
| CaO | 3–35%, preferably 10–25% |
| MgO | 0–15%, preferably 0–10% |
| $Na_2O$ | 0–15%, preferably 6–12% |
| $K_2O$ | 0–15%, preferably 3–12% |
| $R_2O$ ($Na_2O + K_2O$) | 10–17%, preferably 12–17% |
| $P_2O_5$ | 0–3%, especially 0–2% |
| $Fe_2O_3$ (total iron) | 0–15% |
| $B_2O_3$ | 0–8%, preferably 0–4% |
| $TiO_2$ | 0–4% | where MgO is between 0 and 5% when $R_2O \leq 13.0\%$.

This choice of composition, which promotes dissolvability in a physiological medium, in fact makes the rock wool less refractory, which is liable to limit its properties at very high temperature.

In one embodiment, the compositions have iron oxide contents between 5 and 12%, especially between 5 and 8%, which may make it possible to achieve fire resistance of mineral wool blankets, this being a typical property of conventional rock wool.

However, this property is not illustrated—only information about the annealing temperature is given, this being indicative of the service temperature range of the material, but not about the fire behaviour at very high temperature (of the order of 1000° C.).

The object of the present invention is to provide a range of rock-type mineral wool compositions, in which the high-temperature properties, more particularly the fire resistance, are maximized, while preserving biodegradability and ability to be fiberized by an internal centrifugal process.

The subject of the invention is a mineral wool that can dissolve in a physiological medium, which comprises the constituents below in the following percentages by weight:

| | |
|---|---|
| $SiO_2$ | 39–44%, preferably 40–43% |
| $Al_2O_3$ | 16–27%, preferably 16–26% |
| CaO | 6–20%, preferably 8–18% |
| MgO | 1–5%, preferably 1–4.9% |
| $Na_2O$ | 0–15%, preferably 2–12% |
| $K_2O$ | 0–15%, preferably 2–12% |
| $R_2O$ ($Na_2O + K_2O$) | 10–14.7%, preferably 10–13.5% |
| $P_2O_5$ | 0–3%, especially 0–2% |
| $Fe_2O_3$ (total iron) | 1.5–15%, especially 3.2–8% |
| $B_2O_3$ | 0–2%, preferably 0–1% |
| $TiO_2$ | 0–2%, preferably 0.4–1%. |

(In the rest of the text, any percentage of a constituent of the composition should be understood as a percentage by weight).

The composition according to the invention relies on the combination of a high alumina content, of between 16 and 27%, preferably greater than 17% and/or preferably less than 25%, for a sum of the network-forming elements—silica and alumina—of between 57 and 75%, preferably greater than 60% and/or preferably less than 72%, with a quantity of alkali metal (sodium and potassium) oxides ($R_2O$) that is relatively high but limited to between 10 and 13.5%, with magnesia in an amount of at least 1%.

Although these compositions may seem similar to compositions known from WO 00/17117, they exhibit remarkably improved behaviour at very high temperature.

Without wishing to be tied down by any particular scientific theory, it would seem that this composition range makes it possible for crystallization seeds to be nucleated at low temperature, these seeds causing the appearance or the growth of crystals at a sufficiently low temperature at which the softening or sintering of the material is not yet able to be effective. It may be considered that, by crystallizing components more fusible than the overall glass composition, the viscosity of the residual glass increases and the surface forces involved for sintering are no longer high enough to prevail over the viscous cohesion forces.

Preferably, the alumina is present in an amount of 17 to 25.5%, especially 20 to 25%, in particular 21 to 24.5% and especially around 22 to 23 or 24% by weight.

Advantageously, good refractoriness may be obtained by adjusting the magnesia content, especially to at least 1.5%, in particular 2%, especially greater than or equal to 2.5% or 3%. A high magnesia content is conducive to a low-temperature crystallizing effect that opposes the lowering of viscosity generally observed at high temperature, and therefore prevents the material from sintering.

One advantageous composition selection consists in providing the required minimum amount of magnesia, this being greater the lower the amount of alumina.

Thus, when the alumina is present in an amount of at least 22% by weight, the amount of magnesia is preferably at least 1%, advantageously around 1 to 4%, preferably 1 to 2% and in particular 1.2 to 1.6%. The alumina content is preferably limited to 25% in order to preserve a sufficiently low liquidus temperature. When the alumina is present in a lower amount, for example around 17 to 22%, the amount of magnesia is preferably at least 2%, especially around 2 to 5%.

The lime is advantageously present at contents of between 9.5 and 20%, preferably between 10 and 18% and even more preferably from 11 to 16%.

The total amount of lime and magnesia may advantageously be around 14 to 20%, especially 15 to 19%.

The total amount of alkaline-earth metal oxides (lime, magnesia, barium oxide and strontium oxide) is preferably between 10 and 20%, especially from 12 to 18%.

The amount of silica is advantageously around 40 to 43%, and more particularly 41 to 42%, by weight.

Depending on the embodiments of the invention, the alkali metal oxide content is preferably less than or equal to 13.2%, or even 13.0%, especially around 10 to 12.5% and in particular 10.2 to 12% or less.

Sodium oxide and potassium oxide may each be present in an amount of 3 to 9% by weight.

Within this range of alkali metal oxide contents, it proves advantageous to choose a ratio of the alkali metal oxide content to alumina content such that the $R_2O/Al_2O_3$ molar ratio is less than 1, in particular less than 0.9, especially at most 0.8 and in particular at most 0.75.

When the molar ratio is greater than 0.9, it is preferable for the magnesia content to be high enough to produce a low-temperature crystallizing effect, for example at least 2%, or at least 2.5%, otherwise excessively low glass transition temperatures would be obtained, with a deleterious effect on the behaviour at very high temperature.

An $R_2O/Al_2O_3$ molar ratio of less than 0.9 produces a favourable effect on refractoriness, in particular at low temperature, and therefore on the softening point and the sintering temperature.

However, within this composition range a sufficiently large difference is maintained between the temperature corresponding to the viscosity for fiberizing and the liquidus temperature of the phase that crystallizes—thus good fiberizing conditions.

The iron oxide present in the composition has a positive impact on the nucleation of growth of seeds at low temperature, while still limiting the liquidus. However, its amount is preferably limited so as not to adversely affect biosolubility in acid medium. In a preferred embodiment of the invention, the compositions have iron oxide contents of between 2 and 6%, preferably around 3 to 6%.

The titanium oxide provides a very noticeable effect on the nucleation at high and low temperature of spinels within the glassy matrix. A content of the order of 1% or less may prove to be advantageous.

$P_2O_5$ may be used, at contents of between 0 and 3%, especially between 0.1 and 1.2%, to increase the biosolubility at neutral pH.

Other oxides, such as BaO, SrO, MnO, $Cr_2O_3$ and $ZrO_2$, may be present in the composition, each with contents of up to about 2%.

The difference between the temperature corresponding to a viscosity of $10^{2.5}$ poise (decipascal·second), denoted by $T_{log2.5}$, and the liquidus of the crystallizing phase, denoted by $T_{liq}$, is preferably at least 10°. This difference, $T_{log2.5}-T_{liq}$, defines the "working range" for the compositions of the invention, that is to say the temperature range within which fiberization is possible, most particularly by an internal centrifugal process. This difference is preferably at least 10, 20 or 30° C., preferably 40° C. and even more than 50° C., especially more than 100° C.

The compositions are well suited to the internal centrifugal fiberizing process with a viscosity at a temperature of 1400° C. of more than 70 poise, especially around 75 to 250 poise.

The compositions according to the invention have high glass transition temperatures, especially above 600° C., in particular greater than or equal to 650° C. Their annealing temperature, denoted by $T_{annealing}$, is well above 600° C., especially around 670° C. or higher, often 700° C. or higher.

The fire resistance of the products may be determined by a shrinkage measurement and/or a creep deformation measurement carried out on the product at a temperature above 700° C. and up to 1000° C.

Fire resistance is quite well correlated with the measurement of the high-temperature sintering contraction on a compacted fine powder. The compositions according to the invention are characterized by a 700° C. contraction of less than 40%, especially around 20 to 40% or better still less than 20%, and by an 800° C. shrinkage of less than 90%, especially around 75 to 90% or better still less than 75%.

As mentioned above, the mineral wool exhibits a satisfactory level of biosolubility especially at acid pH. It thus has in general a rate of dissolution, especially measured on silica, of at least 30 and preferably at least 40 or 50 $ng/cm^2$ per hour measured at pH 4.5 using a method similar to that described in the NF T 03-410 standard.

This type of composition, with a high alumina content and a high alkali metal oxide content, may advantageously be melted in fired glass furnaces or electric glass furnaces.

The invention also relates to the use of the mineral wool described above in fire-resistant structural systems.

The expression "fire-resistant structural systems" is understood to mean systems generally comprising assemblies of materials, especially based on mineral wool and metal plates, that can effectively retard the propagation of heat and also provide protection against flames and hot gases and maintain mechanical strength during a fire.

Standardized tests define the degree of fire resistance, expressed especially as the time needed for a given temperature to be reached on the opposite side of the structural system that is exposed to a heat flux generated, for example, by the flames of a burner or by an electric furnace.

A structural system is considered to exhibit satisfactory fire resistance if it is able in particular to meet the requirements of one of the following tests:
  fire door test: tests on mineral fibre boards, as defined in the German standard DIN 18 089—Part 1 (or equivalent);
  fire behaviour of building materials and elements, as defined in the German standard DIN 4102 (or equivalent). In particular, the standard DIN 4102—Part 5 is considered for full-scale tests so as to determine the fire resistance class, and/or the standard DIN 4102—Part 8 for tests on specimens with a small test bed; and
  normalized test OMI A 754 (18) (or equivalent), which describes the general fire resistance test requirements for "marine"-type applications, especially for ship bulkheads. These tests are carried out on large specimens, with 3 m by 3 m furnaces. Mention may be made, for example, of the case of a steel deck on which the required performance in the case of a fire on the insulation side is to meet the thermal insulation criterion for at least 60 minutes.

Other details and advantageous features will become apparent from the description below of non-limiting preferred embodiments.

Table 1 below gives the chemical compositions of examples according to the invention, in which the following characteristics are also indicated:

the liquidus temperature ($T_{liq}$) and the temperatures at which the viscosity is equal to $10^3$ poise ($T_{log3}$) and $10^{2.5}$ poise ($T_{log2.5}$) respectively, the three temperatures being expressed in ° C.;

the viscosity at 1400° C.;

the shrinkage on powder at 700° C. and 800° C.;

the annealing temperature and the glass transition temperature ($T_g$).

When the sum of all the contents of all the components is slightly less than or greater than 100%, it should be understood that the difference from 100% corresponds to the minor components/impurities that are not always analyzed or cannot be analyzed in trace amounts and/or is due only to the accepted approximation in this field in the analytical methods used.

The purpose of the powder shrinkage test is to quantify the temperature resistance of a composition by measuring the densification of this material taken in the powder state. The protocol is as follows:

160 g of composition is milled in a ring mill for 8 minutes and then the powder is screened on an 80 μm screen followed by a 40 μm screen for 12 minutes. That part of the powder having a particle size of less than 40 μm is mixed with 8% water by weight and a pellet is manufactured from this mixture. Placed on a pressing support is a tungsten-carbide-lined pelletizer body 10 mm in diameter and this is introduced against the piston. 3.110 g of the powder/water mixture are weighed and introduced into the pelletizer, then the piston is introduced and setting spacers 37 mm in height are positioned between the body of the pelletizer and the upper part of the piston. The powder is pressed, ensuring that the upper part of the piston bears on the spacers. A specimen 28 mm in height and 10 mm in diameter is removed. The specimen is placed in a furnace on a flat support and the furnace is heated to the test temperature within a 700-1150° C. operating range with a temperature rise of 360° C./h. The furnace is maintained at the test temperature for 16 h and then left to cool. The top and bottom diameters and the mean height are measured on the cooled specimen and from this the volume shrinkage expressed in % is deduced. The general appearance of the specimen is also noted.

The compositions according to these examples can be fiberized by an internal centrifugal process, especially according to the teaching of the aforementioned Patent WO 93/02977.

Their working ranges, defined by the difference $T_{log2.5} - T_{liq}$, are large and positive, especially greater than 50° C., or even 100° C. and even greater than 150° C.

The liquidus temperatures are relatively low, especially not exceeding 1200° C. and even 1150° C.

The temperatures ($T_{log2.5}$) corresponding to viscosities of $10^{2.5}$ poise are compatible with the use of centrifugal spinners for high-temperature fiberizing, especially under the operating conditions described in Application WO 93/02977.

The preferred compositions are in particular those in which $T_{log2.5}$ is less than 1350° C., preferably less than 1300° C.

TABLE 1

| | COMP 1 | COMP 2 | EX 1 | EX 2 | EX 3 | EX 4 | EX 5 | EX 6 | EX 7 |
|---|---|---|---|---|---|---|---|---|---|
| $SiO_2$ | 45.7 | 42.4 | 42 | 41.9 | 43.3 | 42.4 | 42 | 43 | 43.1 |
| $Fe_2O_3$ | 7.4 | 4.8 | 5.4 | 5 | 5 | 5.1 | 4.73 | 5 | 5 |
| $Al_2O_3$ | 18.75 | 23.3 | 23.2 | 23.4 | 22.85 | 22.8 | 23.2 | 23 | 22.8 |
| CaO | 12 | 14.5 | 14.8 | 13.2 | 13.6 | 12.6 | 12.3 | 12.6 | 11.8 |
| MgO | 0.69 | 0.6 | 1.18 | 2.15 | 2.2 | 3.07 | 3.1 | 3.15 | 4 |
| $Na_2O$ | 7.8 | 7.23 | 6.32 | 6.18 | 6.7 | 5.96 | 7.04 | 6.85 | 6.18 |
| $K_2O$ | 5.1 | 4.84 | 4.51 | 5.25 | 4 | 5.08 | 5.3 | 4 | 5.54 |
| $B_2O_3$ | 0 | | | | 0 | | | 0 | 0 |
| BaO | 0.4 | 0.35 | 0.28 | 0.32 | 0.33 | 0.3 | 0.33 | 0.34 | 0.33 |
| $P_2O_5$ | 0.13 | 0.14 | 0.48 | 0.75 | 0.13 | 0.76 | 0.14 | 0.13 | 0.14 |
| $TiO_2$ | 0.46 | 0.77 | 0.74 | 0.88 | 0.75 | 0.83 | 0.86 | 0.76 | 0.75 |
| $R_2O = Na_2O + K_2O$ | 12.9 | 12.07 | 10.83 | 11.43 | 10.49 | 11.04 | 12.34 | 10.85 | 11.72 |
| $R_2O/Al_2O_3$ (mol) | 0.979 | 0.735 | 0.659 | 0.677 | 0.661 | 0.671 | 0.747 | 0.678 | 0.709 |
| T Liquidus | 1147 | 1167 | 1140 | 1167 | 1170 | 1154 | 1204 | 1134 | 1174 |
| $T_{log3}$ | 1209 | | 1178 | 1204 | 1196 | 1197 | 1189 | 1195 | 1197 |
| $T_{log2.5}$ | 1294 | | 1274 | 1284 | 1279 | 1277 | 1279 | 1279 | 1281 |
| $T_{log2.5} - T_{liq}$ | 147 | | 134 | 117 | 109 | 123 | 75 | 145 | 107 |
| Viscosity 1400° C. | | | 82.790 | 85.038 | | 77.938 | 82.936 | 81.283 | 83.980 |
| % Sintering at 700° C. | 52 | 25 | 16 | 18 | 20 | 19 | 18 | 29 | 20 |
| % Sintering at 800° C. | 81 | 91 | 75 | 52 | 65 | 53 | 54 | | |
| $T_{annealing}$ | 675 | 692 | 709 | 707 | 697 | 707 | 696 | | |
| $T_g$ | 635 | 655 | 669 | 659 | 656 | 656 | 653 | | |

| | EX 8 | EX 9 | EX 10 | EX 11 | EX 12 | EX 13 | EX 14 | EX 15 | EX 16 | EX 17 |
|---|---|---|---|---|---|---|---|---|---|---|
| $SiO_2$ | 43.1 | 43 | 41.7 | 41.5 | 40.5 | 41.9 | 41.5 | 40.9 | 41.5 | 42.1 |
| $Fe_2O_3$ | 5 | 5 | 4.87 | 5.18 | 4.6 | 4.5 | 5 | 4.43 | 5.3 | 4.7 |
| $Al_2O_3$ | 22.9 | 23.35 | 24.5 | 24.5 | 24.9 | 23.9 | 25.8 | 24.7 | 25.25 | 23.5 |
| CaO | 11.75 | 10 | 14.3 | 14.17 | 13.7 | 13.25 | 12.4 | 12.5 | 10.17 | 13.22 |
| MgO | 4.2 | 4.2 | 1.1 | 1.65 | 2.02 | 2.075 | 3 | 3.06 | 5.15 | 2.05 |
| $Na_2O$ | 6.8 | 6.6 | 5.15 | 5.15 | 5.27 | 5 | 6.3 | 4.43 | 6.35 | 6.88 |
| $K_2O$ | 4 | 3.9 | 5.9 | 5.16 | 6 | 6.35 | 4 | 6.84 | 4.5 | 5.23 |

TABLE 1-continued

| | | | | | | | | | | |
|---|---|---|---|---|---|---|---|---|---|---|
| $B_2O_3$ | 0 | 1.5 | | | | | 0 | | 0 | |
| BaO | 0.3 | 0.35 | 0.34 | 0.4 | 0.34 | 0.32 | 0.4 | 0.29 | 0.35 | 0.31 |
| $P_2O_5$ | 0.13 | 0.13 | 0.16 | 0.63 | 0.76 | 0.75 | 0.1 | 0.75 | 0.11 | 0.14 |
| $TiO_2$ | 0.76 | 0.84 | 0.93 | 0.33 | 0.98 | 0.73 | 0.27 | 0.99 | 0.27 | 0.84 |
| $R_2O = Na_2O + K_2O$ | 10.8 | 10.5 | 11.05 | 10.31 | 11.27 | 11.35 | 10.3 | 11.27 | | 12.11 |
| $R_2O/Al_2O_3$ (mol) | 0.678 | 0.646 | 0.607 | 0.574 | 0.609 | 0.632 | 0.570 | 0.595 | | 0.723 |
| T Liquidus | 1156 | 1175 | 1167 | 1194 | 1182 | | 1154 | 1220 | | 1164 |
| $T_{log3}$ | 1190 | 1194 | 1217 | 1211 | 1199 | | 1214 | | | 1194 |
| $T_{log2.5}$ | 1273 | 1279 | 1298 | 1293 | 1285 | | 1297 | | | 1284 |
| $T_{log2.5} - T_{liq}$ | 117 | 104 | 131 | 99 | 103 | | 143 | | | 120 |
| Viscosity 1400° C. | 77.485 | 83.590 | 97.884 | 91.400 | 86.480 | | 97.263 | 89.6 | | 87.190 |
| % Sintering at 700° C. | 23 | 21 | 10 | 10 | 14 | 15 | 16 | 11 | 14 | 21 |
| % Sintering at 800° C. | | | 75 | 41 | 39 | 63 | | 38 | | 56 |
| $T_{annealing}$ | | | 722 | 712 | 710 | 713 | | 714 | | 698 |
| $T_g$ | | | 677 | 675 | 669 | 667 | | 671 | | 659 |

The compositions of Examples 2, 10 and 11, and of Comparative Example 2 were used to manufacture a mineral wool blanket by the internal centrifugal technique. The characteristics of the fibres and of the blanket obtained are given in Table 2 below.

The fineness of the fibres is expressed in various ways in this table. When this quantity is expressed in l/min, this refers to a measurement carried out using the method of measuring the fineness of mineral fibres described in Application WO 03/098209. The other fineness values are "micronaire" values measured on 5 g of fibre using the protocol described in the DIN 53941 or ASTM D 1448 standard.

Specimens of these blankets were taken and subjected to a thermal stability test at very high temperature, in which the slump of the specimens was measured according to the procedure defined in the draft standard "Insulating materials: Thermal stability" as proposed by NORDTEST (NT FIRE XX—NORDTEST REMISS No. 1114-93). A specimen of insulating material (especially 25 mm in height and 25 mm in diameter) was introduced into a furnace allowing the slump of the specimen to be observed as a function of the temperature to which the specimen is exposed. The temperature of the furnace was increased at 5° C. per minute from room temperature up to about 1000° C. or higher.

The residual thickness of the specimen, measured at a given temperature, relative to the initial thickness of the specimen (at room temperature) is called the "relative thickness". The value (1—relative thickness) at the given temperature is referred to as the "degree of slump".

FIG. 1 shows the variation in relative thickness of four mineral wool specimens as a function of temperature. This shows that the specimen of Comparative Example 2 rapidly slumps above 720° C. to 800° C. and that the relative thickness is less than 25% after 850° C.

Furthermore, visual inspection of the specimen after the test showed pronounced distortion, the shape being frustoconical with a diameter of 6 mm at the top and 14 mm at the bottom.

The specimens of mineral wool according to the invention exhibited substantially less slump, while better retaining their shape with less of a reduction in the radial dimension compared with the start of the test.

TABLE 2

| | EX. 2 | EX. 10 | COMP. 2a | EX. 11 | COMP. 2 |
|---|---|---|---|---|---|
| Fibre fineness | 12.9 l/min | 12.5 l/min | 13.11 l/min | 3.3/5 g | 3.1/5 g |
| Density (kg/m³) | 43.3 | 56.4 | 52.0 | 52.2 | 34.3 |
| Temperature (° C.) | 960 | 980 | 930 | 930 | 920 |
| % slump | 63 | 60 | 78 | 59 | 75 |
| Top diam. (mm) | 15 | 11 | 6 | 16 | 9 |
| Bottom diam. (mm) | 21 | 20 | 14 | 22 | 19 |

It should be noted that the mineral wool according to the invention is applicable in particular to structural systems as described above, but also to applications in any known form of insulating material intended to furnish installations under extreme conditions, especially such as superheated industrial pipes.

Thus, the invention also relates to insulating products, especially in the form of blankets, rolls, panels or shells. In particular, the subject of the invention is a product in shell form for insulating pipes, especially industrial pipes, comprising mineral wool as defined the present Application, the fibres of which have a mean diameter not exceeding 4 μm, which has a density of 40 to 100 kg/m³ and a binder content of around 4 to 7% by weight.

The invention claimed is:

1. Mineral wool capable of dissolving in a physiological medium, wherein the wool comprises the constituents below in the following percentages by weight:
   $SiO_2$ 39-44%,
   $Al_2O_3$ 16-27%,
   CaO 6-20%,
   MgO 1-5%,
   $Na_2O$ 0-15%,
   $K_2O$ 0-15%
   $R_2O$ ($Na_2O+K_2O$) 10-14.7%,
   $P_2O_5$ 0-3%,
   $Fe_2O_3$ (total iron) 1.5-15%,
   $B_2O_3$ 0-2%,
   $TiO_2$ 0-2%,
   wherein the wool comprises at least 2% MgO when alumina is present in an amount of less than 22%.

2. Mineral wool according to claim 1, wherein the CaO content is between 9.5 and 20%.

3. Mineral wool according to claim 1, wherein the alkali metal oxide content is less than or equal to 13.0%.

4. Mineral wool according to claim 1, wherein the $R_2O/Al_2O_3$ molar ratio is less than 0.9.

5. Mineral wool according to claim 1, wherein the wool comprises 2 to 6% iron oxide.

6. Mineral wool according to claim 1, wherein the wool comprises 1% or less of titanium oxide.

7. Mineral wool according to claim 1, wherein the wool has a viscosity at a temperature of 1400° C. of more than 70 poise.

8. Mineral wool according to claim 1, wherein the wool has a shrinkage at 700° C. of less than 40% and a shrinkage at 800° C. of less than 90%.

9. A fire-resistant structural system comprising a mineral wool according to claim 1.

10. Insulation comprising a mineral wool according to claim 1.

11. Mineral wool according to claim 1, wherein the $SiO_2$ content is between 40 and 43%.

12. Mineral wool according to claim 1, wherein the $Al_2O_3$ content is between 16 and 26%.

13. Mineral wool according to claim 1, wherein the CaO content is between 6 and 20%.

14. Mineral wool according to claim 1, wherein the MgO content is between 1 and 4.9%.

15. Mineral wool according to claim 1, wherein the $Na_2O$ content is between 2 and 12%.

16. Mineral wool according to claim 1, wherein the $K_2O$ content is between 2 and 12%.

17. Mineral wool according to claim 1, wherein the $Na_2O+K_2O$ content is between 10 and 13.5%.

18. Mineral wool according to claim 1, wherein the $P_2O_5$ content is between 0 and 2%.

19. Mineral wool according to claim 1, wherein the $Fe_2O_3$ (total iron) content is between 3.2 and 8%.

20. Mineral wool according to claim 1, wherein the $B_2O_3$ content is between 0 and 1%.

21. Mineral wool according to claim 1, wherein the $TiO_2$ content is between 0.4 and 1%.

* * * * *